US010144550B2

(12) United States Patent
Dunwoody et al.

(10) Patent No.: US 10,144,550 B2
(45) Date of Patent: Dec. 4, 2018

(54) BEVERAGE CAN END HAVING AN ASYMMETRICAL OPENING

(71) Applicant: Crown Packaging Technology, Inc., Aslip, IL (US)

(72) Inventors: Paul Robert Dunwoody, Wantage (GB); Christopher Paul Ramsey, Wantage (GB); Garry Richard Chant, Wantage (GB)

(73) Assignee: Crown Packaging Technology, Inc., Alsip, IL (US)

( * ) Notice: Subject to any disclaimer, the term of this patent is extended or adjusted under 35 U.S.C. 154(b) by 389 days.

(21) Appl. No.: 14/776,246

(22) PCT Filed: Mar. 14, 2014

(86) PCT No.: PCT/US2014/027103
§ 371 (c)(1),
(2) Date: Sep. 14, 2015

(87) PCT Pub. No.: WO2014/152235
PCT Pub. Date: Sep. 25, 2014

(65) Prior Publication Data
US 2016/0039563 A1 Feb. 11, 2016

Related U.S. Application Data

(60) Provisional application No. 61/781,480, filed on Mar. 14, 2013.

(51) Int. Cl.
*B65D 17/40* (2006.01)
*B65D 17/28* (2006.01)
(Continued)

(52) U.S. Cl.
CPC .......... *B65D 17/165* (2013.01); *B65D 1/165* (2013.01); *B65D 17/4012* (2018.01);
(Continued)

(58) Field of Classification Search
CPC .. B65D 17/165; B65D 17/24; B65D 17/4012; B65D 17/404
(Continued)

(56) References Cited

U.S. PATENT DOCUMENTS 3,738,526 A * 6/1973 Zundel ............... B65D 17/4012
220/269
3,923,193 A * 12/1975 Wells ................. B65D 17/4012
220/269
(Continued)

FOREIGN PATENT DOCUMENTS

DE 8915716 U1 3/1991
JP S58-7923 U 5/1983
(Continued)

OTHER PUBLICATIONS

International Patent Application No. PCT/US2014/027103: International Search Report dated Jul. 30, 2014, 4 pages.

*Primary Examiner* — Andrew T Kirsch
(74) *Attorney, Agent, or Firm* — Baker & Hostetler LLP (57) ABSTRACT

A beverage can end for pressurized contents includes a score that defines a pair of The lobes have longitudinal axes that are not mutually parallel and in some embodiments substantially perpendicular to improve flow.

44 Claims, 4 Drawing Sheets (51) Int. Cl.
*B65D 17/00* (2006.01)
*B65D 1/16* (2006.01)

(52) U.S. Cl.
CPC ............... *B65D 2517/0013* (2013.01); *B65D 2517/0059* (2013.01); *Y02A 40/962* (2018.01)

(58) Field of Classification Search
USPC ........................................................ 220/269
See application file for complete search history.

(56) References Cited

U.S. PATENT DOCUMENTS

| | | | |
|---|---|---|---|
| 4,289,251 A * | 9/1981 | Maliszewski | B65D 17/165 |
| | | | 220/269 |
| 5,555,992 A | 9/1996 | Sedgeley | |
| 5,572,893 A | 11/1996 | Goda et al. | |
| 6,499,622 B1 | 12/2002 | Neiner | |
| 6,877,941 B2 | 4/2005 | Brifcani et al. | |
| 7,594,585 B1 * | 9/2009 | Fields | B65D 17/165 |
| | | | 220/269 |
| D622,145 S | 8/2010 | Walsh | |
| 7,819,275 B2 | 10/2010 | Stodd et al. | |
| D638,708 S | 5/2011 | Walsh | |
| D639,164 S | 6/2011 | Walsh | |
| 8,157,119 B2 | 4/2012 | Watson et al. | |
| 2004/0056032 A1 | 3/2004 | Vaughan | |
| 2004/0099664 A1 | 5/2004 | Hartman | |
| 2009/0200306 A1 | 8/2009 | Breunig | |
| 2011/0272406 A1 | 11/2011 | Thibaut et al. | |
| 2012/0031056 A1 | 2/2012 | Chasteen et al. | |
| 2012/0273492 A1 * | 11/2012 | Werth | B65D 17/163 |
| | | | 220/260 |
| 2013/0037542 A1 | 2/2013 | Crothers | |

FOREIGN PATENT DOCUMENTS

| | | |
|---|---|---|
| JP | 2008-168923 A | 7/2008 |
| JP | 2012-201381 A | 10/2012 |
| WO | WO 00/69735 A1 | 11/2000 |
| WO | WO 2011/053776 A1 | 5/2011 |

* cited by examiner

BEVERAGE CAN END HAVING AN ASYMMETRICAL OPENING

CROSS-REFERENCE TO RELATED APPLICATIONS

This application is the National Stage of International Application No. PCT/US2014/027103, filed Mar. 14, 2014, which claims the benefit of U.S. Provisional Application No. 61/781,480 filed Mar. 14, 2013, the disclosures of which are incorporated herein by reference in their entireties for any and all purposes.

BACKGROUND

The present invention relates to containers, and more particular to beverage can ends suitable for use with carbonated beverages.

Twelve-ounce size aluminum beverage cans are produced in vast quantities for holding carbonated soft drinks and beer. Beverage cans include a can body on which a can end is attached by a seam.

The most popular opening mechanism for beverage cans is a stay-on-tab that opens a hinged tear panel. The tear panel is formed by a score in the center panel of the end. The tab is affixed to the can end by a rivet that is in the center of the end. Commercial two piece beverage can end shells are formed by a shell press from a flat blank, which typically is made of a 5000 series aluminum alloy. The shells then enter a conversion press where a stay-on-tab is affixed to the center panel of the end by a rivet. A finished beverage can end is seamed onto a can body after being filled with a beverage.

For example, U.S. Pat. No. 5,555,992 (Sedgeley), entitled "Double Hinged Opening For Container End Members" discloses a central rivet and an elongated tear panel that is opened in a multiple step process. United States Patent Application Publication 20120031056A1 (Chasteen), entitled "Container End Closure With Optional Secondary Vent Opening," discloses a conventionally sized tear panel, which is referred to as a large opening end or LOE, plus a vent that is actuated after twisting the tab.

The industry convention of can sizes employs three digits to represent inches and the quantity of 16th inches. Thus, a 211 can body has a nominal 2 and 11/16 inch diameter. As is understood in the art, and as employed throughout this disclosure, nominal beverage can end sizes do not refer to exact measurements to the outside of the seam. Rather, the nominal size is an industry standard that no longer corresponds to exact diameter because the beverage industry switched to the seaming technology generally referred to as a "mini-seam." In this regard, the nominal size refers generally to the diameter of the outside of the seam plus reduction in the diameter corresponding with the change from an old double seam to a modern, mini-seam.

SUMMARY

A beverage can end includes an asymmetrical opening including a pair of lobes that form an asymmetrical kidney or reinform shape. The beverage can end is generally suitable for use with carbonated beverages, and has a rating of greater than 60 psi, generally including 85 psi or 90 psi rating.

A beverage can end suitable for carbonated beverages, especially for a beverage can having an internal pressure rating greater than 60 psi, and preferably greater than 85 psi, includes: a peripheral curl capable of forming a double seam with a beverage can flange; a wall extending inwardly from the curl; a circular center panel located radially inwardly from the wall; a rivet that is offset from a center of the center panel; a main centerline defined by a center of the rivet and a point P on the periphery of the center panel that is closest to a rivet center, and a normal centerline that lies on the rivet center and is perpendicular to the main center line.

The main centerline and normal centerline define first and second small sectors and first and second large sectors on the center panel such that the first small sector is adjacent to the first large sector. A stay-on tab is coupled to the center panel by a rivet. A score is formed in the center panel and has a first end and a second end. The first score end is located in either the second small sector or the second large sector. The second score end is located in either the second large sector or the first large sector. The score forms a tear panel being openable to form an opening of at least 0.35 square inches and no more than 50 percent of the center panel area. The score defines a first lobe having an end located in the first small sector and a second lobe having an end located in the second large sector. The score defines a first hinge associated with opening of the first lobe upon a first actuation of the tab and a second hinge associated with opening of the second lobe upon a second actuation of the tab.

The pull tab has a nose for contacting the tear panel, a heel opposite the nose, and an elongate body extending between the nose and the heel. The body includes a rivet island through which the rivet extends. Preferably, the pull tab heel is spaced apart from the wall structure by at least 0.3 inches to enhance finger access, and a portion of the rivet island forms a tab hinge upon actuation of the tab and the rivet island is rotatable about the rivet. The tab is capable of a first position that is adapted for rupturing a first portion of the score to move the tear panel about the first hinge and a second position that is adapted for rupturing a second portion of the score to move the tear panel about the second hinge.

The first score position is such that a longitudinal axis of the tab when in its rest position is coincident with the main center line and the second score position is angularly displaced from the first score position. Preferably, the first hinge meets the score first end and the second hinge meets score first end and the score second end, and preferably there is a third hinge that has a first end meeting the first lobe and a second end meeting the second lobe.

The lobes have a preferred shape consistent with the goals of the end. The first lobe has a portion defined by a first lobe radius R1 and the second lobe portion has a portion defined by a second lobe radius R2, and radius R2 is approximately between 40% and 90% greater radius R1, preferably radius R2 is approximately between 50% and 70% greater than R1. The first lobe has a dimension D3 measured coincident with the main centerline that is approximately between 15 percent and 33 percent of the center panel diameter, preferably approximately between 17 percent and 27 percent of the center panel diameter. The dimension D3 measured coincident with the main centerline that is approximately between 6.6 mm and 13.2 mm, and preferably approximately between 7.5 mm and 12.0 mm.

A maximum width of the second lobe radius R2 is approximately between 8 percent and 40 percent of the center panel diameter, and preferably approximately between 13 percent and 28 percent of the center panel diameter. A maximum width of the second lobe radius R2 is approximately between 3.5 mm and 17.6 mm, and preferably approximately between 6 mm and 12 mm. The score second lobe has a return that extends toward the second small section.

The score includes a distal curve that forms a distal boundary of the first lobe and the second lobe, the distal curve being spaced apart from the periphery of the center panel by a dimension D7 that is approximately between 4 percent and 14 percent of the center panel diameter. The first lobe has an aspect ratio of between 2.0 and 3.5, and preferably between 2.2 and 3.0. The first lobe aspect ratio is defined as the height measured on the main centerline divided into the greatest length of the first lobe measured parallel to the normal line.

A dimension D1 measured along the main centerline between a center of the rivet and a portion of the score proximate the center panel periphery is between 20 percent and 33 percent of the center panel diameter. The rivet center is spaced apart from a peripheral edge of the center panel by a dimension D2 that is approximately between 30 percent and 42 percent of the center panel diameter.

A maximum dimension D4 of the tear panel measured parallel to the main center line and through the second small segment and the second large segment is approximately between 40 percent and 80 percent of the center panel diameter, and preferably between 45 percent and 68 percent of the center panel diameter. The maximum dimension D4 of the tear panel measured parallel to the main center line and through the second small segment and the second large segment is approximately between 17.6 mm and 35.2 mm, and preferably 20 mm and 30 mm.

A maximum dimension D5 of the tear panel measured parallel to the normal center line through the first and second small segments is approximately between 35 percent and 70 percent of the center panel diameter, and preferably between 45 percent and 60 percent of the center panel diameter. The dimension D5 is approximately between 15.4 mm and 30.8 mm, and preferably approximately between 20 mm and 26 mm.

The rivet center is spaced apart from the center panel center by a dimension D6 that is approximately between 7 percent and 18 percent of the center panel diameter.

The inventive structure is provided with dimensional ratios, and for particular embodiments, magnitudes. The inventive concept is not intended to be limited to the particular embodiments or ratios unless expressly set out in the claims.

DESCRIPTION OF PREFERRED EMBODIMENTS

Figure 1:
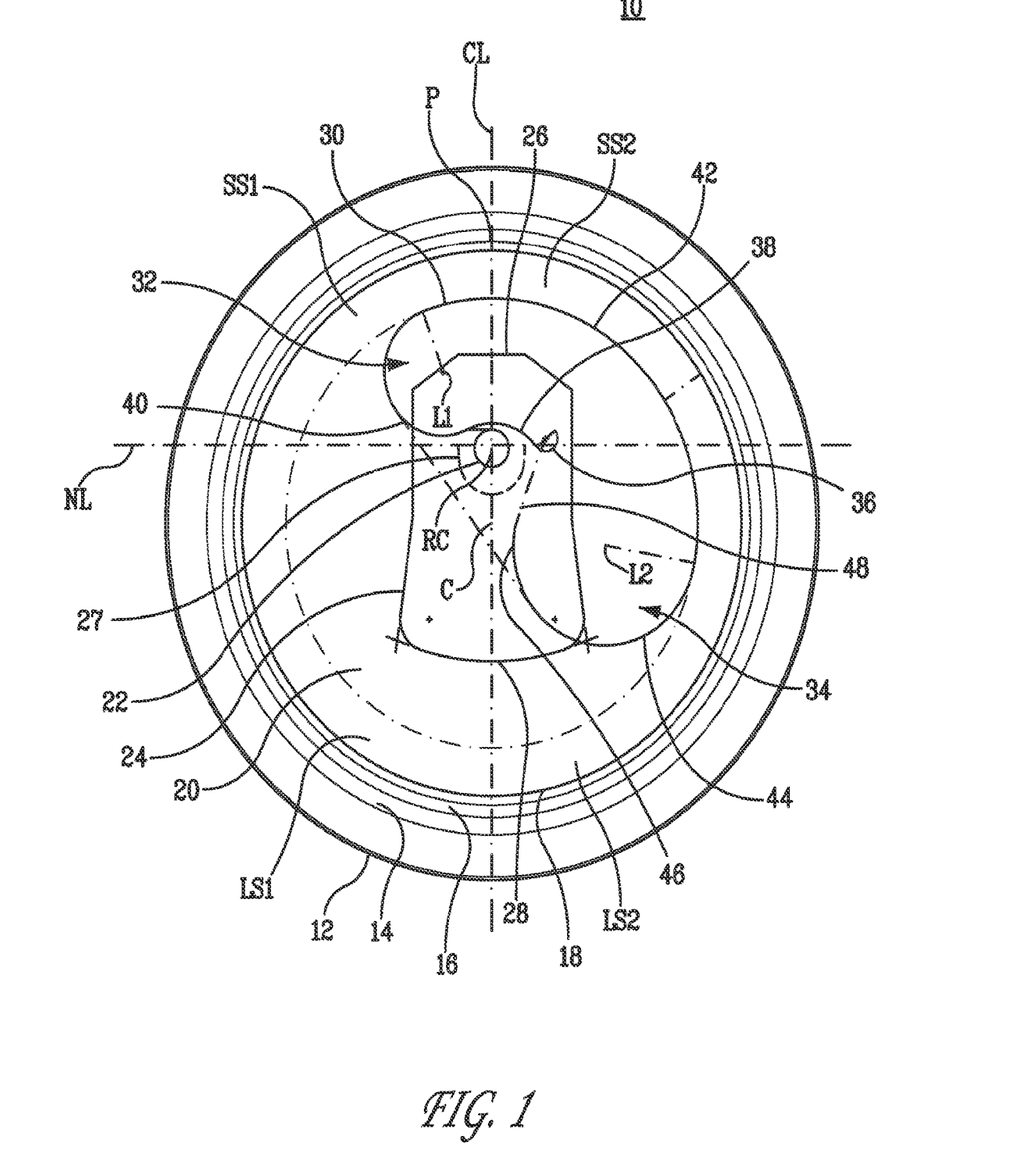
FIG. 1 is an enlarged top view of a beverage can end illustrating an embodiment of the present invention.
Figure 3:
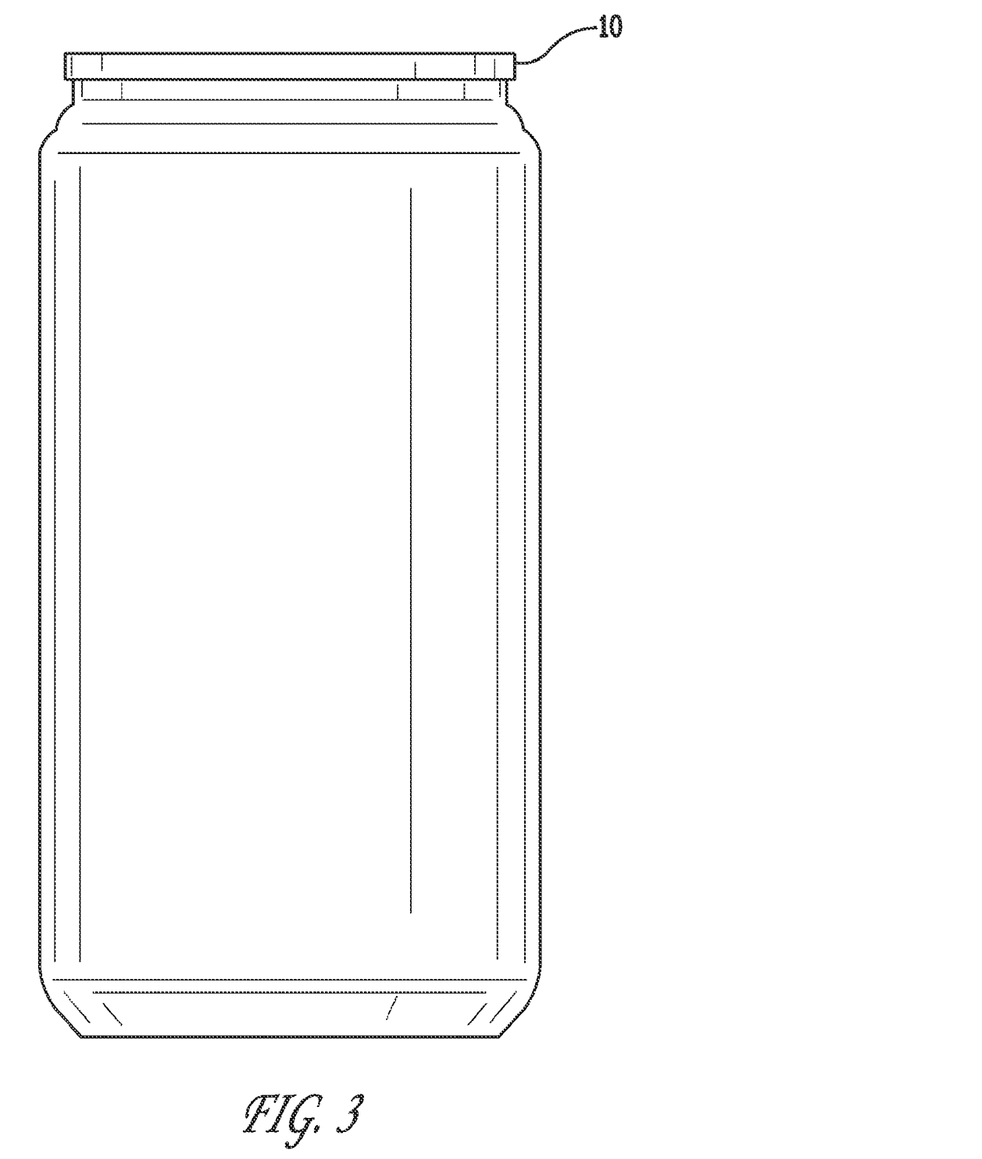
FIG. 3 is another view of the end of FIG. 1 illustrating preferred dimensions.
Figure 4:
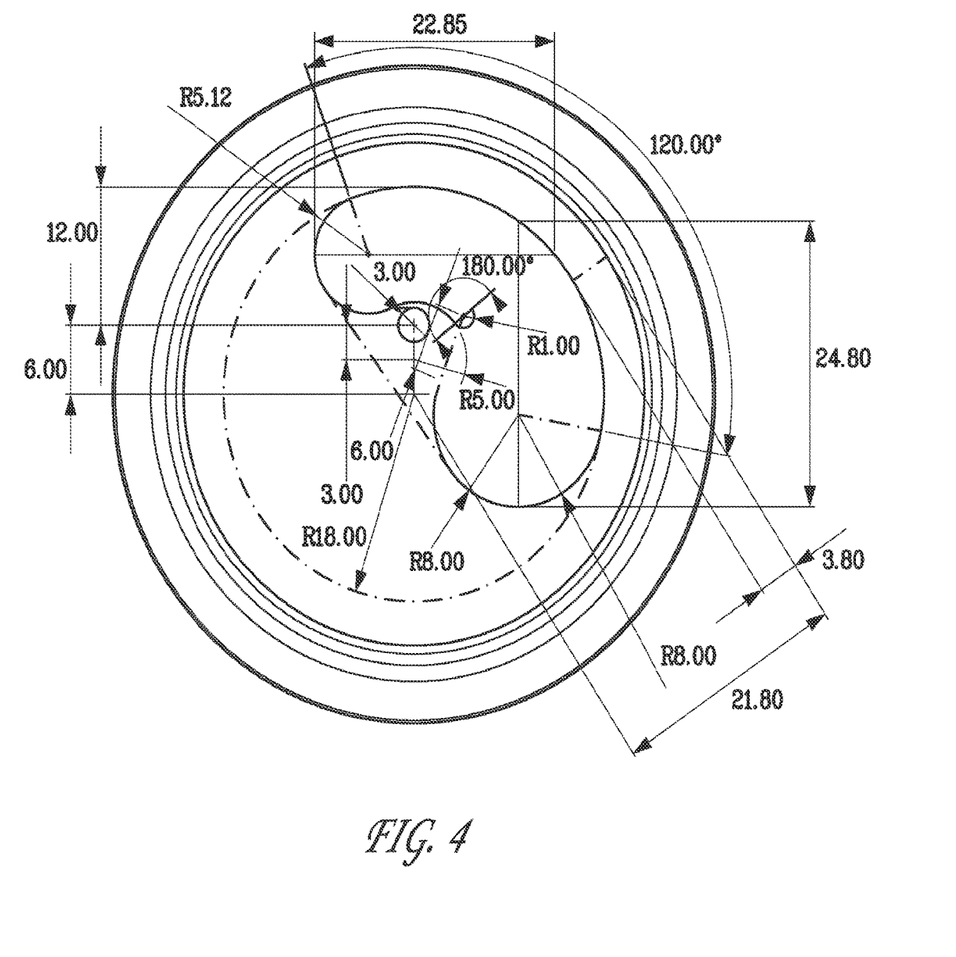
FIG. 4 is a schematic illustration of a beverage can that employs the end of FIG. 1.

FIG. 1 illustrates an end according to an embodiment of the present invention. End 10 includes a peripheral curl 12, a wall 14, a reinforcing bead 16, a panel wall 18, and a center panel 20. Curl 12 is a type that can be mated with a flange of an aluminum beverage can body for forming a seam that preferably is a conventional double seam. The can body may be a conventionally necked 211 body (as shown in FIG. 3) or a sleek or slim can body, each of which is well known in the art, or a highly necked can body as disclosed in U.S. Patent Application No. 61/787,191, entitled "Necked Beverage Can Having A Seamed-On End."

Wall 14 extends radially inwardly from curl 12 to an annular, upwardly opening reinforcing bead 16. An optional panel wall 18 extends from an inner limit of bead 16. Panel wall 18, if any, encompasses a curve and/or a chamfer. Center panel 20 preferably is flat to the extent of conventional beverage end flatness after conventional manufacturing processes. Center panel 20 is shown without recesses, although the present invention encompasses recesses, embosses, and/or beads if desired. Center panel 20 is also circular to the extent commonly understood and, as within normal manufacturing tolerances and upon slight deflection under pressurization). A dimension D8 is the distance between a center C of center panel 20 and the periphery of center panel 20, and therefor defines the center panel radius. The periphery of the center panel may be defined by the transition between center panel 20 and annular bead 16 or, where a panel wall 18 is present, by the transition between panel wall 18 and annular bead 16. For ends having a fold or like structure, the periphery may be defined as the transition between the center panel 20 or panel wall 18 with the fold or like structure.

Modern lightweight end shells, such as for example shown in U.S. Pat. No. 6,877,941 (Brifcani), U.S. Pat. No. 8,157,119 (Lockley); U.S. Pat. No. 7,819,275 (Stodd); and U.S. Pat. No. 6,499,622 (Neiner) and their commercial equivalents and variations, have a reinforcing bead diameter and a panel diameter that are small relative to the seam diameter compared to older or non-lightweight ends, such as an end known as a b64 end. Ends disclosed herein may be used with modern, lightweight end shells (including other modern lightweight ends not referred to above) or the older end shells, such as a b64 end.

A rivet 22 is formed in center panel 20, preferably by conventional means. Rivet 22 defines a rivet center RC that is spaced apart from a center C of center panel 20 by a distance D6.

Because rivet center RC is offset relative to center panel center C, a point P on the periphery of the center panel can be defined as the point on the periphery of the center panel that is closest to rivet center RC. A line between rivet center RC and point P also passes through center point C to define a main centerline CL. Point P defines a front of the end. A line perpendicular to centerline CL and passing through rivet center RC defines a normal centerline NL. Again because rivet center is offset relative to point C, centerline CL and NL divide center panel into a pair of small sectors and a pair of large sectors. First sector small sector SS1 is arbitrarily defined as in the upper left of end 10 shown in FIG. 1. Second small sector SS2 is defined on the upper right, first large sector LS1 is defined on the lower left, and second large sector SS2 is defined on the lower right as shown in FIG. 1.

A tab 24 has a tab nose 26 at a front end and a tab heel 28 at the opposing back end. Tab 24 is shown in outline in the figures. A rivet island 27 is schematically shown in FIG. 1. Preferably rivet island 27 and rivet 24 are conventional such that tab 24 is pivotable on rivet 24. In this regard, when tab 24 is in its at rest state (that is, approximately parallel with center panel 20) it can be pivoted relative to score 30. Further, after tab 24 has been actuated (as explained more fully below), it has the capability of then being rotated relative to score 30, preferably after tab 24 is returned to a position close to parallel to center panel 20. In the embodiment of the figures, in its as-manufactured state, tab 24 has a centerline that is coincident with main centerline CL. Tab 24 and center panel 20 are configured such that tab heel 28 is spaced apart from the end wall structure 14 by at least 0.3 inches to enhance finger access.

Score 30 defines an unbalanced kidney-shaped tear panel 31 that has a first lobe 32 and a second lobe 34. Each one of lobe 32 and lobe 34 define a longitudinal axis, which axes are not parallel to one another, and as shown in the figures are approximately mutually perpendicular. First lobe 32 extends into first small sector SS1 and second lobe extends into second large sector LS2. A score first end 36 is located in either the second small section SS2 or second large section LS2. In this regard, score first end 36 (and thus an end of hinge H1 and H1') may be in front of or to the rear of normal line NL. Score first end 36 includes an inwardly (that is, bending toward or into the tear panel) oriented curl.

A score proximal section 38 bends in front of rivet 22 and extends into first small sector SS1. Proximal section 38 may include a check slot, as will be understood by persons familiar with end technology. Proximal section 38 merges smoothly into a score first lobe portion or end 44 that smoothly curves and extends toward the bead 16 to form first lobe 32. In the embodiment shown in FIG. 1, the major part of score lobe portion 40 is formed by a radius R1 having a center at a point L1 in first small sector SS1.

First score lobe portion 40 smoothly merges into score distal portion 42, which in the embodiment in the figures lies on a circle that is concentric with center C such that the distal portion 42 is spaced apart from the periphery of center panel by a distance D7 for the entire extent of the second small sector SS2 and approximately 30 degrees into second large sector LS2. Score distal curve 42 also forms a distal boundary of the first lobe and the second lobe, and conceptually may separate a portion of the lobes. The extent of score distal portion 42 preferably is approximately 120 degrees, and the extent can widely vary depending on the choice of other parameters of the opening. In general, the extent of distal score can be 90 degrees to 150 degrees.

Score second lobe portion 44 smoothly merges from distal portion 42. In the embodiment shown in the figures, score second lobe portion has a radius R2 about a point L2. Preferably, radius R2 that is between 40% and 90% greater than score first lobe portion radius R1, more preferably between 50% and 70% greater, and in the figures about 60% greater. Score second lobe portion 44 curves to form a score return portion 46 that extends generally back toward rivet 22. Score return terminates at score second end 48. In the embodiment shown in the figures, radius R2 also determines or strongly influences the width of second lobe 34, as explained below.

First lobe 32 preferably has an aspect ratio of between 2.0 to 3.5, and more preferably 2.2 to 3.0. The aspect ratio of first lobe 32 is defined as the distance between opposing parts of the score 30 (for example, height D3 for the embodiment of the figures) measured on the main centerline divided into the widest part or greatest length of the first lobe (for example, width D5 for the embodiment of the figures) between opposing parts of score 30 measured along any line that is parallel to the normal line. Second lobe 34 has an aspect ratio of between 1.1 and 3.0, and more preferably 1.2 to 2.1. The aspect ratio of second lobe 34 is defined as the maximum width of the second lobe measured along the normal centerline (for example, two times R2 for the embodiment of the figures) divided into the maximum height of the second lobe measured parallel to the main centerline (for example, width D4 for the embodiment of the figures). Tear panel 31, which is the sum of first and second lobes 32 and 34 and also the area defined by the score and second hinge H2, preferably is at least 0.35 square inches and no more than 50 percent of the center panel area, preferably at least 0.4 square inches and no more than 40 percent of the center panel area, which is defined by the periphery of the center panel.

Figure 2:
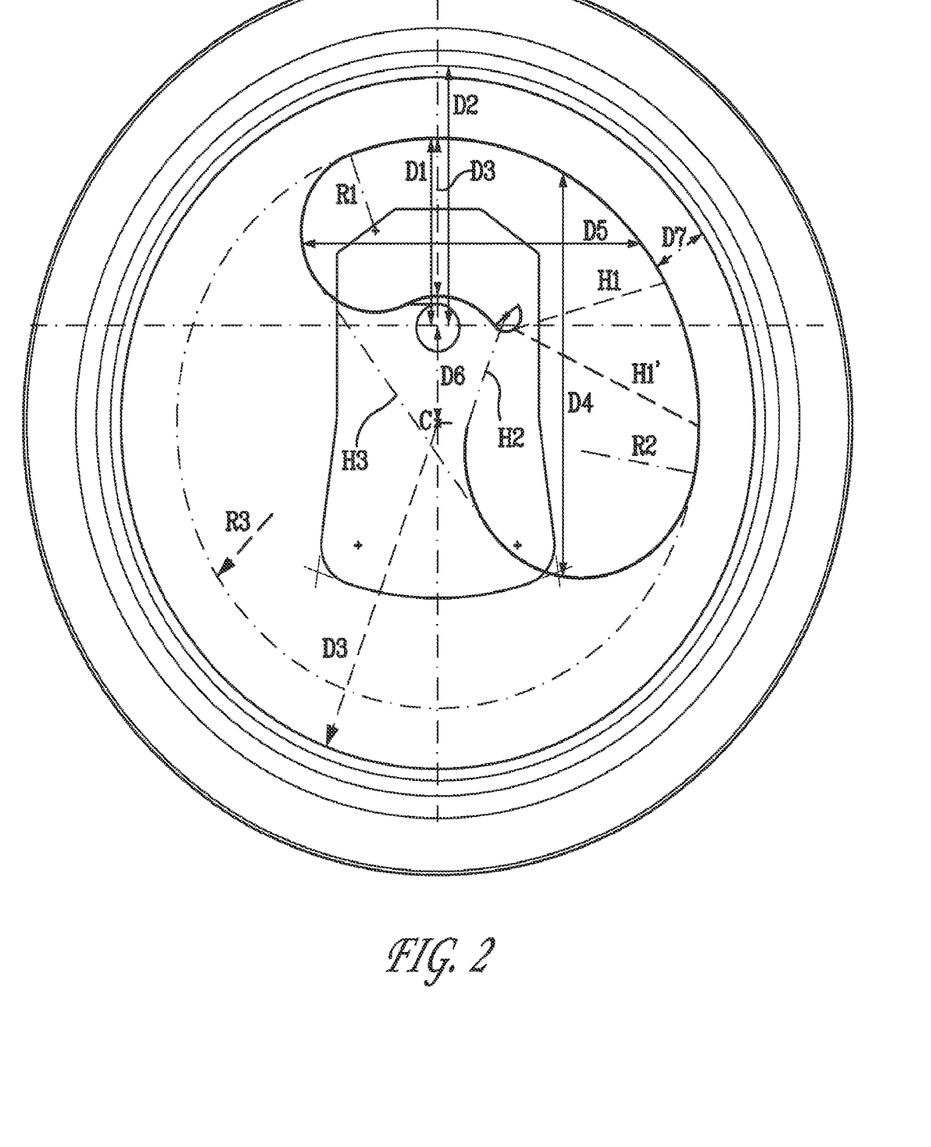
FIG. 2 is another view of the end of FIG. 1 illustrating dimensions.

The orientation of score 30 is such that score first end 36 and a portion of score distal portion 42 form a first hinge H1 that is identified schematically on FIG. 2. The location of first hinge H1 is approximate, and an alternative location of the first hinge is identified on FIG. 2 by dashed line H1' such that the second end of the hinge may be formed on lobe portion 44. A second hinge H2 is formed between score second end 48 and score first end 36 or a portion of score proximal portion 38 near first end 36. A third hinge H3 is formed between lobes 32 and 34, such as between either score proximal portion 28 or score first lobe curve 40 and either score second lobe curve 44 or score return portion 46.

In addition to the dimensions and description above, some dimensions aid in the illustration of end 10. Rivet center RC is spaced apart from the score distal portion 42 along main centerline CL at (as shown in FIG. 2) by a dimension D1. In another embodiment (not shown in the figures) dimension D1 is the distance between rivet center RC and score first lobe portion 42 along main centerline CL. Rivet center RC is spaced apart from the periphery of center panel 20 along main centerline CL by a distance D2.

A dimension D3 of first lobe 32 is measured between opposing portions of score 30 coincident with the main centerline CL, and therefore can represent a first lobe height. A dimension D4 reflects the maximum dimension of the tear panel measured parallel to the main center line and through the second small segment and the second large segment, and therefore can represent a second lobe height. The dimension D5 reflects the maximum dimension of the tear panel measured parallel to the normal center line through the first and second small segments, and therefore can represent a first lobe width. A corresponding second lobe width is represented in the embodiment of the figures by twice R2. The rivet center RC is spaced apart from the center panel center C by a dimension D6.

The end shown in the figures is a 200 size end. The present invention may be employed with ends smaller or larger than a 200 size end. For convenience of illustration, dimension D8 is provided only approximately for the 200 size end, and the invention is not limited thereto.

Values for the dimensions illustrate aspects of end 10. The values below are for a 200 size end and the ranges are based on the ratio of the dimension to the center panel diameter. The present invention encompasses an end having any dimension or percentage provided herein, alone or in combination. In this regard, the ranges provided herein are intended to apply to an end of any center panel diameter or nominal end size. Further, the present invention is not limited any particular dimension or ratio unless expressly stated in the claims.

The values provided to the dimensions D1 through D8 and R1 through R3 are as follows:

Column A is an exemplary dimension in millimeters for a 200 size beverage can end. Column A' is the values of column A represented as a percentage of the center panel diameter.

Columns B and C are the upper and lower ranges of the ratio of the dimension to the center panel diameter for any size end.

Columns D and E are the upper and lower ranges of the dimension in millimeters, which ranges apply particularly the end shown in the figures but also to an end of any commercially feasible, seamed-on, stay-on-tab end.

TABLE 1

| Dimension | | A mm | A' % | B % | C % | D mm | E mm |
|---|---|---|---|---|---|---|---|
| D1 | rivet center RC to distal score portion | 12 | 27.3 | 20 | 33 | 8.8 | 14.5 |
| D2 | rivet center RC to periphery p | 16 | 36.4 | 30 | 42 | 13.2 | 18.5 |
| D3 | first lobe height | 9 | 20.5 | 15 | 33 | 6.6 | 13.2 |
| D4 | second lobe height | 25 | 56.8 | 40 | 80 | 17.6 | 35.2 |
| D5 | first lobe width | 23 | 52.3 | 35 | 70 | 15.4 | 30.8 |
| D6 | rivet center RC to center C | 6 | 13.6 | 7 | 18 | 3.1 | 7.9 |
| D7 | score distal portion to periphery p | 4 | 9.1 | 4 | 14 | 1.8 | 6.2 |
| D8 | center panel radius | 22 | 50.0 | | | | |
| R1 | first lobe radius | 5.1 | 11.6 | 6 | 20 | 2.6 | 8.8 |
| R2 | second lobe radius | 8 | 18.2 | 8 | 40 | 3.5 | 17.6 |
| R3 | score distal portion radius | 18 | 40.9 | 36 | 46 | 15.8 | 20.2 |

Further, the main score or panel opening has preferred sub-ranges. First lobe height D3 preferably is between 7.5 mm and 12.0 mm, or between 17 percent and 27 percent of the center panel diameter. Second lobe height D4 preferably is between 20 mm and 30 mm, or between 45 percent and 68 percent of the center panel diameter. First lobe width D5 preferably is between 20 mm and 26 mm, or between 45 percent and 59 percent of the center panel diameter. Second lobe radius R2 or second lobe width preferably is between 6 mm and 12 mm, or between 13 percent and 27 percent of the center panel diameter.

A preferred radius of score proximal section 38 is 5.0 mm from a center that is on centerline CL and 3.0 mm behind rivet center RC, and using the exemplary dimensions 3.0 mm in front of center point C. In this regard, the proximal portion 38 can curve about a rivet having a radius of 1.0 mm, then form an inflection point in section SS1. The dimension of proximal section radius may be chosen based on the parameters described herein.

The inventor surmises that to use can end 10, a user may first engage and lift heel 28 from its at-rest or as-manufactured state shown in the figures. Raising heel 28 deforms center panel 20 at rivet 22 and deforms the tab body relative to rivet island 27 such that nose 26 engages tear panel 31 in front of score proximal section 38—that is, engaging first lobe 32. Upon initial rupture of score 30 at or near score first end 36, the score ruptures about score 30 as tear panel 31 pivots about hinge H1. Because the opposing or second end of first hinge H1 or H1' is on score 30, hinge H1 or H1' in some embodiments might not produce as sharp a transition as the hinge in a conventional 12 ounce beverage can. Optionally, the second or opposing end of H1 or H1' can include a short curve or kink in the score, a discontinuity in the score (that is, a small break in the score), or a thickened score residual to inhibit or stop score propagation.

After the user actuates tear panel 31 about first hinge H1 or H1', the user may then return tab 24 to near its original orientation by, for example, pushing down on tab heel 28. Then, the user may rotate tab clockwise (as oriented in the figures) such that tab nose 26 is located over and can engage second lobe 34. Then upon raising heel 28, the rupturing of score 30 can be reinitiated and propagate about second lobe 34 until the score rupture propagation stops at score second end 48. The above pivoting is intuitive because of the relatively large second lobe, but a user may also grasp tab 24 while it is in its upright position and twist the tab about an axis that is nearly vertical. Optionally, after actuating tab 24 about the first and second hinges, the user may then produce a downward force on the tab, further pivoting a portion of center panel 20, which portion is outside of score 30 and not part of tear panel 31, about hinge H3.

Alternatively, a user may first pivot tab 24 about rivet 22 such that raising heel 28 cause nose 26 to engage a portion of tear panel 31 such that score 30 ruptures entirely from score first end 36 to score second end 48.

The present invention has been described with respect to a particular embodiment. The asymmetrical opening extends to a position sufficiently diametrically or otherwise opposed to the position of a conventional opening that air can smoothly enter the can without "glugging." In this regard, the contents are poured or drunk from the position of the widest aperture. Further, the asymmetrical configuration enables a relatively large opening, particularly in circumstances in which a reduction in the size of the end would otherwise require either a reduction in the size of the opening or a reduction in ease of finger access to operate the tab. The present invention is not limited to structure having these benefits, nor to any aspect of the particular embodiment unless expressly stated in the claims.

We claim:

1. A beverage can end pressure rated for at least 60 psi, the end comprising a peripheral curl capable of forming a double seam with a beverage can flange; a wall extending inwardly from the curl; a circular center panel located radially inwardly from the wall;
   a rivet that is offset from a center of the center panel;
   a main centerline defined by a center of the rivet and a point P on the periphery of the center panel that is closest to the center of the rivet, and a normal centerline that lies on the center of the rivet and is perpendicular to the main center line;
   the main centerline and normal centerline defining first and second small sectors and first and second large sectors on the center panel such that the first small sector is adjacent to the first large sector;
   a stay-on tab coupled to the center panel by the rivet, a longitudinal axis of the tab being coincident with the main centerline, the longitudinal axis extending through a center of a nose of the tab and through a center of a heel of the tab;
   a score formed in the center panel and having a first end and a second end, the first score end being located in either the second small sector or the second large sector, the second score end being located in either the second large sector or the first large sector, the score forming a tear panel being openable to form an opening of at least 0.35 square inches and no more than 50 percent of the center panel area;
   the score defining a first lobe having an end located in the first small sector and a second lobe having an end located in the second large sector, the first and second lobe forming a reniform shape;
   the score defining a first hinge associated with opening of the first lobe upon a first actuation of the tab and a second hinge associated with opening of the second lobe upon a second actuation of the tab.

2. The beverage can end of claim 1 wherein the nose of the pull tab is for contacting the tear panel, the heel being opposite the nose, and wherein the pull tab has an elongate body extending between the nose and the heel, the body including a rivet island through which the rivet extends.

3. The beverage can end of claim 2 wherein the pull tab heel is spaced apart from the wall structure by at least 0.3 inches to enhance finger access.

4. The beverage can end of claim 2 wherein a portion of the rivet island forms a tab hinge upon actuation of the tab and the rivet island is rotatable about the rivet.

5. The beverage can end of claim 4 wherein the tab is capable of a first position that is adapted for rupturing a first portion of the score to move the tear panel about the first hinge and a second position that is adapted for rupturing a second portion of the score to move the tear panel about the second hinge.

6. The beverage can end of claim 5 wherein the first score position is such that the longitudinal axis of the tab when in its rest position is coincident with the main center line.

7. The beverage can end of claim 5 wherein the second score position is angularly displaced from the first score position.

8. The beverage can end of claim 2 wherein the first hinge meets the score first end and the second hinge meets score first end and the score second end.

9. The beverage can end of claim 2 further comprising a third hinge having a first end meeting the first lobe and a second end meeting the second lobe.

10. The beverage can end of claim 1 wherein a dimension D1 measured along the main centerline between a center of the rivet and a portion of the score proximate the center panel periphery is between 20 percent and 33 percent of the center panel diameter.

11. The beverage can end of claim 1 wherein the rivet center is spaced apart from a peripheral edge of the center panel by a dimension D2 that is approximately between 30 percent and 42 percent of the center panel diameter.

12. The beverage can end of claim 1 wherein the first lobe has a dimension D3 measured coincident with the main centerline that is approximately between 15 percent and 33 percent of the center panel diameter.

13. The beverage can end of claim 1 wherein the first lobe has a dimension D3 measured coincident with the main centerline that is approximately between 17 percent and 27 percent of the center panel diameter.

14. The beverage can end of claim 1 wherein the first lobe has a dimension D3 measured coincident with the main centerline that is approximately between 6.6 mm and 13.2 mm.

15. The beverage can end of claim 1 wherein the first lobe has a dimension D3 measured coincident with the main centerline that is approximately between 7.5 mm and 12.0 mm.

16. The beverage can end of claim 1 wherein a maximum dimension D4 of the tear panel measured parallel to the main center line and through the second small sector and the second large sector is approximately between 40 percent and 80 percent of the center panel diameter.

17. The beverage can end of claim 1 wherein a maximum dimension D4 of the tear panel measured parallel to the main center line and through the second small sector and the second large sector is approximately between 45 percent and 68 percent of the center panel diameter.

18. The beverage can end of claim 1 wherein a maximum dimension D4 of the tear panel measured parallel to the main center line and through the second small sector and the second large sector is approximately between 17.6 mm and 35.2 mm.

19. The beverage can end of claim 1 wherein a maximum dimension D4 of the tear panel measured parallel to the main center line and through the second small sector and the second large sector is approximately between 20 mm and 30 mm.

20. The beverage can end of claim 1 wherein a maximum dimension D5 of the tear panel measured parallel to the normal center line through the first and second small sectors is approximately between 35 percent and 70 percent of the center panel diameter.

21. The beverage can end of claim 1 wherein a maximum dimension D5 of the tear panel measured parallel to the normal center line through the first and second small sectors is approximately between 45 percent and 60 percent of the center panel diameter.

22. The beverage can end of claim 1 wherein a maximum dimension D5 of the tear panel measured parallel to the normal center line through the first and second small sectors is approximately between 15.4 mm and 30.8 mm.

23. The beverage can end of claim 1 wherein a maximum dimension D5 of the tear panel measured parallel to the normal center line through the first and second small sectors is approximately between 20 mm and 26 mm.

24. The beverage can end of claim 1 wherein the first lobe has a portion defined by a first lobe radius R1 and the second lobe has a portion defined by a second lobe radius R2, wherein a maximum width of the second lobe radius R2 is approximately between 8 percent and 40 percent of the center panel diameter.

25. The beverage can end of claim 24 wherein a maximum width of the second lobe radius R2 is approximately between 13 percent and 28 percent of the center panel diameter.

26. The beverage can end of claim 1 wherein the first lobe has a portion defined by a first lobe radius R1 and the second lobe has a portion defined by a second lobe radius R2, wherein a maximum width of the second lobe radius R2 is approximately between 3.5 mm and 17.6 mm.

27. The beverage can end of claim 26 wherein a maximum width of the second lobe radius R2 is approximately between 6 mm and 12 mm.

28. The beverage can end of claim 1 wherein the score second lobe has a return that extends toward the second small section.

29. The beverage can end of claim 1 wherein the rivet center is spaced apart from the center panel center by a dimension D6 that is approximately between 7 percent and 18 percent of the center panel diameter.

30. The beverage can end of claim 1 wherein the score includes a distal curve that forms a distal boundary of the first lobe and the second lobe, the distal curve being spaced apart from the periphery of the center panel by a dimension D7 that is approximately between 4 percent and 14 percent of the center panel diameter.

31. The beverage can end of claim 1 wherein a first end of the first hinge is located in the second small sector and a second end of the first hinge is located in the second large sector.

32. The beverage can end of claim 1 wherein a first end of the first hinge and a second end of the first hinge are located in the second large sector.

33. The beverage can end of claim 1 further comprising an annular reinforcing bead connected between the center panel and the wall.

34. The beverage can end of claim 33 wherein the center panel includes a panel wall that merges into the reinforcing bead.

35. The beverage can end of claim 1 wherein the opening is at least 0.4 square inches and no more than 40 percent of the center panel area.

36. A beverage can comprising:
a can end of claim 1; and
a can body coupled to the can end by a double seam.

37. A beverage can end suitable for carbonated beverages, the end comprising: a peripheral curl capable of forming a double seam with a beverage can flange; a wall extending inwardly from the curl; a circular center panel located radially inwardly from the wall;
a rivet in the center panel;
a main centerline defined by a center of the rivet and a point P on the periphery of the center panel that is closest to a rivet center, and a normal centerline that lies on the rivet center and is perpendicular to the main center line, the main centerline and normal centerline defining first and second small sectors and first and second large sectors on the center panel such that the first small sector is adjacent to the first large sector;
an asymmetrical reniform score for forming a tear panel, the score including a first lobe having an end located in the first small sector and a second lobe having an end located in the second large sector; an outer boundary of the score extending in an approximate arc between 90 degrees and 150 degrees about a center C of the center panel; and
a stay-on tab coupled to the center panel by a rivet.

38. A beverage can end pressure rated for at least 60 psi, the end comprising a peripheral curl capable of forming a double seam with a beverage can flange; a wall extending inwardly from the curl; a circular center panel located radially inwardly from the wall;
a rivet that is offset from a center of the center panel;
a main centerline defined by a center of the rivet and a point P on the periphery of the center panel that is closest to the center of the rivet, and a normal centerline that lies on the center of the rivet and is perpendicular to the main center line;
the main centerline and normal centerline defining first and second small sectors and first and second large sectors on the center panel such that the first small sector is adjacent to the first large sector;
a stay-on tab coupled to the center panel by the rivet, a longitudinal axis of the tab being coincident with the main centerline, the longitudinal axis extending through a center of a nose of the tab and through a center of a heel of the tab;
a score formed in the center panel and having a first end and a second end, the first score end being located in either the second small sector or the second large sector, the second score end being located in either the second large sector or the first large sector, the score forming a tear panel being openable to form an opening of at least 0.35 square inches and no more than 50 percent of the center panel area;
the score defining a first lobe having an end located in the first small sector and a second lobe having an end located in the second large sector;
the score defining a first hinge associated with opening of the first lobe upon a first actuation of the tab and a second hinge associated with opening of the second lobe upon a second actuation of the tab,
wherein the first lobe has a portion defined by a first lobe radius R1 and the second lobe has a portion defined by a second lobe radius R2, and radius R2 is approximately between 40% and 90% greater than radius R1.

39. The beverage can end of claim 38 wherein radius R2 is approximately between 50% and 70% greater than R1.

40. A beverage can end pressure rated for at least 60 psi, the end comprising a peripheral curl capable of forming a double seam with a beverage can flange; a wall extending inwardly from the curl; a circular center panel located radially inwardly from the wall;
a rivet that is offset from a center of the center panel;
a main centerline defined by a center of the rivet and a point P on the periphery of the center panel that is closest to the center of the rivet, and a normal centerline that lies on the center of the rivet and is perpendicular to the main center line;
the main centerline and normal centerline defining first and second small sectors and first and second large sectors on the center panel such that the first small sector is adjacent to the first large sector;
a stay-on tab coupled to the center panel by the rivet, a longitudinal axis of the tab being coincident with the main centerline, the longitudinal axis extending through a center of a nose of the tab and through a center of a heel of the tab;
a score formed in the center panel and having a first end and a second end, the first score end being located in either the second small sector or the second large sector, the second score end being located in either the second large sector or the first large sector, the score forming a tear panel being openable to form an opening of at least 0.35 square inches and no more than 50 percent of the center panel area;
the score defining a first lobe having an end located in the first small sector and a second lobe having an end located in the second large sector;
the score defining a first hinge associated with opening of the first lobe upon a first actuation of the tab and a second hinge associated with opening of the second lobe upon a second actuation of the tab,
wherein the first lobe has an aspect ratio of between 2.0 and 3.5, the first lobe aspect ratio is defined as the height measured on the main centerline divided into the greatest length of the first lobe measured parallel to the normal line.

41. The beverage can end of claim 40 wherein the first lobe has an aspect ratio of between 2.2 and 3.0.

42. The beverage can end of claim 40 wherein the second lobe has an aspect ratio of between 1.1 and 3.0, the second lobe aspect ratio is defined as the maximum width of the second lobe measured along the normal centerline divided into the maximum height of the second lobe measured parallel to the main centerline.

43. The beverage can end of claim 42 wherein the second lobe has an aspect ratio of between 1.2 and 2.1.

44. A beverage can end pressure rated for at least 60 psi, the end comprising a peripheral curl capable of forming a double seam with a beverage can flange; a wall extending inwardly from the curl; a circular center panel located radially inwardly from the wall;
a rivet that is offset from a center of the center panel;
a main centerline defined by a center of the rivet and a point P on the periphery of the center panel that is closest to the center of the rivet, and a normal centerline that lies on the center of the rivet and is perpendicular to the main center line;
the main centerline and normal centerline defining first and second small sectors and first and second large sectors on the center panel such that the first small sector is adjacent to the first large sector;

a stay-on tab coupled to the center panel by the rivet, a longitudinal axis of the tab being coincident with the main centerline, the longitudinal axis extending through a center of a nose of the tab and through a center of a heel of the tab;

a score formed in the center panel and having a first end and a second end, the first score end being located in either the second small sector or the second large sector, the second score end being located in either the second large sector or the first large sector, the score forming a tear panel being openable to form an opening of at least 0.35 square inches and no more than 50 percent of the center panel area;

the score defining a first lobe having an end located in the first small sector and a second lobe having an end located in the second large sector;

the score defining a first hinge associated with opening of the first lobe upon a first actuation of the tab and a second hinge associated with opening of the second lobe upon a second actuation of the tab, wherein no part of the score extends into the first large sector.

\* \* \* \* \*